Nov. 18, 1924.

J. D. MULVEHILL

INDICATOR

Filed May 12, 1924

1,516,304

Inventor

John D. Mulvehill.

By Brown & Phelps

Attorneys

Patented Nov. 18, 1924.

1,516,304

UNITED STATES PATENT OFFICE.

JOHN D. MULVEHILL, OF SEATTLE, WASHINGTON.

INDICATOR.

Application filed May 12, 1924. Serial No. 712,896.

*To all whom it may concern:*

Be it known that I, JOHN D. MULVEHILL, a citizen of the United States, residing at Seattle, in the county of King and State of Washington, have invented certain new and useful Improvements in Indicators, of which the following is a specification.

The invention relates to indicating devices, and has as an object the provision of a device adapted to be secured to the dash board of an automobile to indicate at what odometer readings the grease cups should be filled or otherwise lubricated, and also upon what dates the battery should be supplied with distilled water.

A further object of the invention is the provision of an indicator having four independently operated numeral bearing disks and a fixed numeral whereby an indication of numbers of five figures may be secured.

A further object of the invention is the provision of an indicator in which the numeral wheels are carried upon a plate having a marginal flange to provide a recess in the rear thereof adapted to be closed by the surface upon which the indicator is secured.

Further objects of the invention will appear from the following description when read in connection with the accompanying drawing showing an illustrative embodiment of the invention, and wherein—

Figure 1:
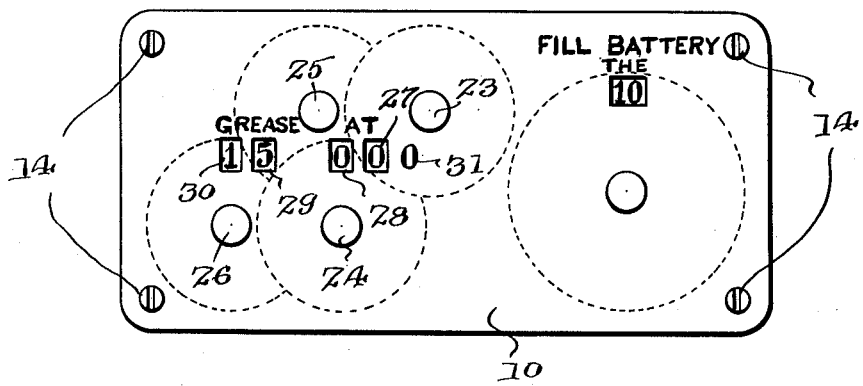
Fig. 1 is a front elevation.
Figure 2:
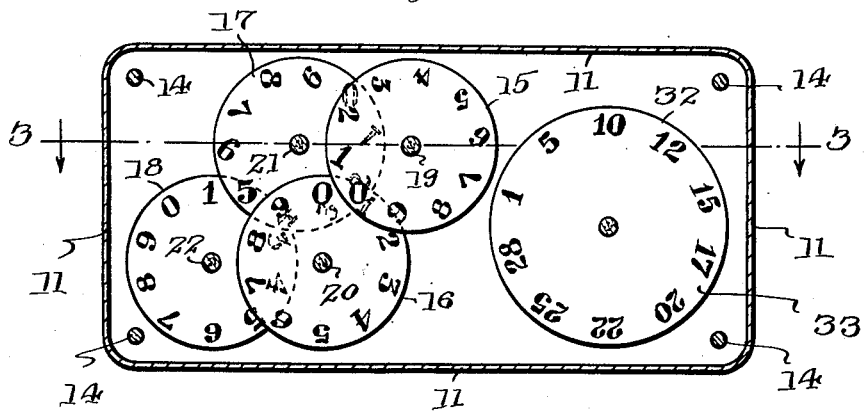
Fig. 2 is a vertical section on line 2, 2 of Fig. 3
Figure 3:
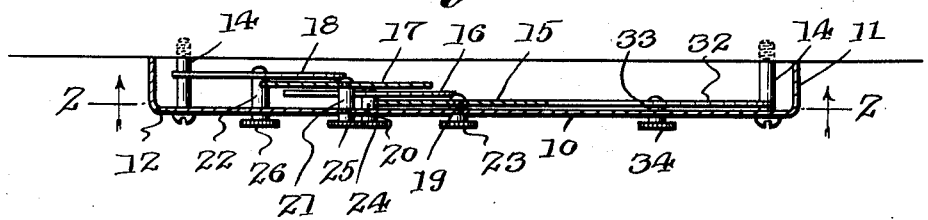
Fig. 3 is a horizontal section on line 3, 3 of Fig. 2.

As shown the device comprises a plate 10 having a marginal flange 11 projecting rearwardly therefrom. The plate and flange are preferably formed by pressing from a sheet of material so as to provide rounded corners, as at 12. The rear of the device is left open and is adapted to be closed by a structure 13, such as the dash-board of a vehicle, against which the device is adapted to be secured, as by screws 14.

To support numeral bearing disks 15, 16, 17, 18, there are shown shafts 19, 20, 21, 22, each having a shoulder bearing against the plate 10, and a second shoulder against which the respective disks are seated, and secured as by the upsetting of the reduced end portion of the shaft. To provide for manual adjustment of each disk independently, there is shown a knurled knob fixed upon the end of each shaft, as at 23, 24, 25, 26. The knobs may desirably be secured upon the shafts by screw threaded engagement with a screw threaded reduced extremity of the shaft projecting through an opening in plate 10 in each case.

As shown, the disks bearing the successive numerals are placed alternately above and below the reading line of the device, and the numerals are overlapped so as to bring the numerals into contiguity. Windows 27, 28, 29, 30 are provided in the plate upon a reading line opposite which windows the desired numeral may be brought by manipulation of the knobs 23 to 26 inclusive.

The position of the disks and windows is such that the numerals will be closely grouped in pairs with separation of the pairs.

To provide the capacity of five figures by the use of only four dials a fixed zero is placed upon the plate 10, as at 31, which zero is grouped with the right-hand pair. The result of the arrangement is that the two numerals to be left represent thousands and the three to the right represent hundreds, and by use of the zero 31 only tens can be denoted by the right-hand figure, which is a sufficiently close adjustment for the purposes of the invention.

In initiating the use of the device with a new car, the numeral disks may be manipulated to show through the windows the odometer reading at which it is desired to perform the first greasing operation, which should be carried out with a new car at a less interval than with an old car. As the car upon which the device is mounted becomes "worked in" the interval from each greasing operation may be lengthened, and the device may be set at any odometer reading at which it is desired to carry out the next greasing operation, the setting being made whenever the car is greased. The greasing indicator is adapted to carry the indication through with the odometer reading up to the number 99,990, with the arrangement of numerals shown, utilizing but four numeral wheels, and because of their independent operation the setting may be made with perfect freedom to indicate the greasing intervals.

If desired, the indicator may be set at the odometer reading when greased, in which event the same would serve as a memorandum as to when the operation was carried out, and the time for the subsequent greasing operation would be arrived at by subtracting the indicator reading from the odometer reading.

To indicate the filling of the battery, which should be upon a time basis rather than upon a mileage basis, a numeral disk 32 is shown at the right of the device mounted upon a shaft 33 and controlled by a knob 34 similar to the shafts 19 to 22, inclusive, and the knobs 23 to 26 inclusive. The numeral disk 33 is provided with numerals to indicate two and three day intervals of the month, with the exception of the first two intervals. Therefore when the battery is given attention the disk may be set to indicate the next day of the month upon which the duty should be performed.

The device will be seen to be exceedingly simple and cheap to manufacture and efficient for the service desired.

I claim:

An indicator comprising, in combination, a plate, a marginal flange projecting rearwardly from said plate to provide a recessed back, a plurality of numeral disks housed in said recess, stub shafts mounting said disks upon said plate in overlapped relation, alternate disks being placed above and below the central line of said plate, windows substantially upon the horizontal central line of said plate for viewing the numerals upon said disk, said numerals being grouped in separated pairs, a fixed numeral borne by the face of said plate in alinement and grouping with the right-hand pair of windows and knobs borne by said stub shaft upon the front of said plate for independent manual control of said disk.

JOHN D. MULVEHILL.